(12) United States Patent
D'Addetta et al.

(10) Patent No.: US 11,172,347 B2
(45) Date of Patent: Nov. 9, 2021

(54) METHOD AND DEVICE FOR PROVIDING A PIECE OF INJURY INFORMATION ABOUT AN INJURY OF AN UNPROTECTED ROAD USER IN THE EVENT OF A COLLISION WITH A VEHICLE

(71) Applicant: Robert Bosch GmbH, Stuttgart (DE)

(72) Inventors: Gian Antonio D'Addetta, Stuttgart (DE); Thomas Lich, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/763,749

(22) PCT Filed: Dec. 17, 2018

(86) PCT No.: PCT/EP2018/085226
§ 371 (c)(1),
(2) Date: May 13, 2020

(87) PCT Pub. No.: WO2019/121526
PCT Pub. Date: Jun. 27, 2019

(65) Prior Publication Data
US 2020/0374680 A1  Nov. 26, 2020

(30) Foreign Application Priority Data
Dec. 18, 2017 (DE) .................. 1012017223005.3

(51) Int. Cl.
*H04W 4/90* (2018.01)
*B60R 21/0132* (2006.01)
(Continued)

(52) U.S. Cl.
CPC ........... *H04W 4/90* (2018.02); *B60R 21/0132* (2013.01); *B60R 21/0134* (2013.01);
(Continued)

(58) Field of Classification Search
CPC .. H04W 4/90; B60R 21/0132; B60R 21/0134; B60R 21/34; B60R 2021/0027; G06F 17/18; G06N 7/005
(Continued)

(56) References Cited

U.S. PATENT DOCUMENTS 9,646,428 B1 * 5/2017 Konrardy ................ G01S 19/48
9,855,947 B1 * 1/2018 Penilla ............. G08G 1/096716
(Continued)

FOREIGN PATENT DOCUMENTS

DE          10324216 A1   12/2004
DE       102015118195 A1    5/2016

OTHER PUBLICATIONS

Rosen et al.: "Pedestrian fatality risk as a function of car impact speed", Published 2009, Autoliv Research. Wal/entinsviigen 22, 447 83, Vcl rgclrda, Sweden, 7 pages.*
(Continued)

*Primary Examiner* — Mong-Thuy T Tran
(74) *Attorney, Agent, or Firm* — Norton Rose Fulbright US LLP; Gerard Messina

(57) ABSTRACT

A method for providing a piece of injury information about an injury of an unprotected road user in the event of a collision with a vehicle. In this method, a probability value, which represents a probability of a degree of severity of the injury, is determined using a function representing the degree of severity as a function of at least one collision parameter characterizing the collision. A piece of injury information is generated using the probability value, which is finally sent to a receiving station of an emergency call system.

8 Claims, 5 Drawing Sheets

(51) Int. Cl.
*B60R 21/0134* (2006.01)
*B60R 21/34* (2011.01)
*G06F 17/18* (2006.01)
*G06N 7/00* (2006.01)
*B60R 21/00* (2006.01)

(52) U.S. Cl.
CPC .............. *B60R 21/34* (2013.01); *G06F 17/18* (2013.01); *G06N 7/005* (2013.01); *B60R 2021/0027* (2013.01)

(58) Field of Classification Search
USPC ....................................................... 455/404.1
See application file for complete search history.

(56) References Cited

U.S. PATENT DOCUMENTS

| | | | | |
|---|---|---|---|---|
| 10,042,359 | B1* | 8/2018 | Konrardy | B60R 25/252 |
| 10,393,532 | B2* | 8/2019 | Foreman | G01C 21/3415 |
| 2014/0300739 | A1* | 10/2014 | Mimar | G08B 21/06 |
| | | | | 348/148 |
| 2017/0210323 | A1* | 7/2017 | Cordova | G08G 1/0141 |
| 2018/0072283 | A1* | 3/2018 | Nakatsuka | B60R 21/00 |
| 2018/0126901 | A1* | 5/2018 | Levkova | B60Q 9/00 |
| 2018/0233015 | A1* | 8/2018 | Feng | G01S 19/42 |
| 2018/0365772 | A1* | 12/2018 | Thompson | G06Q 50/30 |
| 2020/0053537 | A1* | 2/2020 | Klein | H04M 1/72421 |

OTHER PUBLICATIONS

Crandall et al. "Designing road vehicles for pedestrian protection", University of Virginia, 4 pages (Year: 2002).*
Gandhi et al. "Pedestrian Protection Systems: Issues, Survey, and Challenges", IEEE Transactions on Intelligent Transportation Systems, vol. 8, No. 3, Sep. 2007, 18 pages (Year: 2007).*
Nicolao etal, "A Collision Risk Assessment Approach as a Basic for the ON-board Warning Generation in Cars", Intelligent Vehicle Symposium, 2002. IEEE, 6 pages (Year: 2002).*
International Search Report for PCT/EP2018/085226, dated Apr. 4, 2019.
Chris Jurewicz et al., "Exploration of Vehicle Impact Speed—Injury Severity Relationships for Application in Safer Road Design", Transportation Research Procedia, vol. 14, 2016, pp. 4247-4256. XP055575278.

* cited by examiner

METHOD AND DEVICE FOR PROVIDING A PIECE OF INJURY INFORMATION ABOUT AN INJURY OF AN UNPROTECTED ROAD USER IN THE EVENT OF A COLLISION WITH A VEHICLE

FIELD

The present invention is directed to a method and a device FOR providing a piece of injury information. The present invention is also directed to a computer program.

BACKGROUND INFORMATION

A task of some convention automatic emergency call systems is to automatically transmit an emergency call in the event of accidents involving a vehicle, for example, a car or a motorcycle. Such systems are also referred to as eCall systems. These are to ensure that a rescue chain is established as quickly as possible. For this purpose, aside from the essential information about the position of the injured person or of his/her vehicle as per EU regulations, a minimum of pieces of information are transmitted, which are used to estimate the potential injury severity of the occupants. A rescue coordination center is informed according to the result. These are primarily pieces of information about a belt fastening status, an airbag deployment, a collision speed or a location. As of 2018, an automated emergency call function in the case of accidents of motor vehicles is to be mandatorily introduced in all new vehicles in the EU. Thus, following an accident, the position and the driving direction together with the information that there was an accident, are transmitted to the rescue services.

With the introduction of further automatic and semi-automatic driving functions, presumably fewer accidents will occur in the future. It may be concluded, however, that of the remaining accidents, a significantly greater percentage than at present will involve accidents with unprotected road users, also referred to as vulnerable road users (VRU). Thus, attention is focused increasingly on accidents between automatically driving vehicles and pedestrians or two-wheelers, in particular, in the urban surroundings. Since in these surroundings it is not possible to adapt the driving speed to a speed at which, at any time and sudden, in particular, prohibited crossing attempts, may be prevented without accident, a corresponding residual risk remains here for automatic driving functions.

A method for sending an emergency call and an emergency call management system are described, for example, in German Patent Application No. DE 102015118195 A1.

SUMMARY

In accordance with the present invention, a method for providing a piece of injury information about an injury of an unprotected road user in the event of a collision with a vehicle, a device that uses this method and a corresponding computer program, are provided. Advantageous refinements of and improvements on the example device are possible with the measures described herein.

In accordance with an example embodiment of the present invention, an injury severity calculation may be carried out for unprotected road users in a vehicle in the context of an automatic emergency call system, in particular, for pedestrians, bicycle riders or motorcycle riders. Thus, it is possible in the event of an accident to ascertain and convey a piece of information about a possible injury severity of the other party involved. Such a piece of injury severity information may then be transmitted in the protocol for the rescue coordination center.

An advantage lies in the improved rescue measures as a result of the definitive injury severity information with respect to unprotected road users. In accordance with an example embodiment of the present invention, it is further advantageous if, for example, pieces of surroundings information of the accident location, for example, relating to accessibility of the accident location for rescue vehicles, rescue helicopters or recovery vehicles are conveyed on the basis of the evaluation of pieces of surroundings information from a surroundings sensor system of the vehicle that is possibly automatically driving or is equipped with a corresponding driving assistance sensor system. Important additional information for the rescue coordination center, for example, "pedestrian came from the left," which the affected party may be unable to convey due to a state of shock, for example, may optionally be provided, which is also advantageous. The approach described herein also makes the reduction of accident consequences possible by deriving strategies for accident mitigation and may be utilized for automatically driving vehicles for developing scenarios for the future prevention of accidents involving unprotected road users. No separate eCall safety system is advantageously required in the case of the unprotected road user for implementing the approach described herein.

An example method in accordance with the present invention for providing a piece of injury information about an injury of an unprotected road user in the event of a collision with a vehicle, may include the following steps:

determining a probability value, which represents a probability of a degree of severity of the injury, using a function representing the degree of severity as a function of at least one collision parameter characterizing the collision;

generating the injury information using the probability value; and sending the injury information to a receiving station of an emergency call system, in order to provide the injury information.

An unprotected road user may, for example, be understood to mean a pedestrian or a bicycle rider (also Pedelec or eBike) or a motorcycle rider, but also other users who are on the way, for example, on a scooter, but are officially classified as pedestrians. A degree of severity may be understood to mean a value for characterizing different degrees of injury such as, for example, "uninjured," "slightly injured," "severely injured," or "fatally injured." In addition to a characterization, a degree of severity may also be understood to mean a detailing according to body region, for example, "chest severely injured" or "arm slightly injured." A collision parameter may be understood to mean, for example, an initial speed or collision speed of the vehicle, a trigger decision with respect to a passenger protection device of the vehicle, a preceding activation of an emergency braking system or evasion system of the vehicle, an estimated age or gender of the road user, a type of collision, a walking or driving direction or an estimated walking speed or driving speed of the road user, a so-called entry angle or collision angle, a piece of car-to-VRU information, i.e., for example, a piece of information conveyed from a smartphone or stored on another device, which is unblocked in an emergency situation and, for example, includes personal data such as age, gender, weight or previous illnesses of the road user, a piece of information of a surroundings sensor of the vehicle, for example, relating to an actual position of the road user relative to the vehicle, or a piece of information about limitations of the road user, for example, either directly or indirectly about a pace of the road user via detection of a wheelchair, a cane or a walking aid. A function may, for example, be understood to mean a one-dimensional or multidimensional injury risk function. The injury information may represent the degree of severity of the injury, a piece of information derived therefrom or other relative pieces of information relating to the collision involving the unprotected road user. An emergency call system may, for example, be understood to mean an automatic emergency call system, also referred to as an eCall system. However, an emergency call system may also be understood to mean a piece of automatic information to third parties, for example, to private persons and not necessarily to a rescue center. A receiving station may be understood to mean a receiving unit used for notifying a rescue coordination center. The vehicle may include a corresponding communication interface, for example, for the wireless transmission of the injury information to the receiving unit.

According to one specific embodiment of the present invention, the probability value may be determined as the collision parameter in the step of determining as a function of a collision speed at which the vehicle and the road user collide with one another. A collision speed may, for example, be understood to mean a relative speed between the road user and the vehicle. In this way, the injury information may be reliably provided using only one collision parameter.

According to another specific embodiment, the probability value may be determined in the step of determining using the following exemplary function:

$$f(v_c) = \frac{1}{1 + e^{(a+b\,v_c)}},$$

a standing for a first function parameter,
b standing for a second function parameter and
$v_c$ standing for the collision speed.

As would be clear to those skilled in the art, based on the present disclosure, functions including one or multiple variables may also be used as a basis for determining an injury severity probability. A function parameter may, for example, be understood to mean a parameter stored in a memory, experimentally ascertained or estimated for describing a functional correlation between the collision parameter(s) and the probability of the degree of severity of the injury. As a result, the function may be easily and exactly parameterized.

The example method may include a step of reading in an activation signal, which represents an activation of at least one passenger protection device of the vehicle. In this case, the probability value may be determined in the step of determining using the activation signal in response to the activation. A passenger protection device may, for example, be understood to mean a liftable engine hood, a windshield airbag or other vehicle external airbag or an adaptable crash structure of the vehicle optimized to protect the unprotected road user. In this way, the efficiency of the method may be increased.

It is further advantageous if in the step of determining, at least one further probability value, which represents a probability of a further degree of severity of the injury, is determined as a function of the collision parameter using the function and/or a further function representing the further degree of severity. Accordingly, the injury information may be generated in the step of generating using the further probability value. This allows for a differentiated estimation of the injury severity.

According to another specific embodiment of the present invention, the further probability value may be determined in the step of determining by forming a difference between a function value of the function assigned to the collision parameter and a further function value of the further function assigned to the collision parameter. In this way, the further probability value may be determined with minimal computing time.

It is also advantageous if in the step of determining at least one additional probability value, which represents a probability of an additional degree of severity of the injury, is determined using the function and/or the further function. The injury information in this case may be generated in the step of generating using the additional probability value. In this way, the injury information may be provided with the greatest possible efficiency and accuracy.

The additional probability value may be advantageously determined in the step of determining by subtracting a sum of the probability value and the further probability value from a maximum probability value representing a maximum probability. The maximum probability value may, for example, represent a probability of 100 percent. With this specific embodiment as well, it is possible to increase the efficiency of the method.

The example method according to the present invention may also include a step of ascertaining the collision parameter using an additional piece of information relating to the road user received via a communication interface of the vehicle. An additional piece of information may, for example, be understood to mean a piece of information about a position, a movement, a line of sight, a gender or an age of the road user. The additional information may, for example, be a piece of information transmitted wirelessly to the vehicle using a mobile terminal of the road user, for example, a smart phone. In this way, it is possible to increase the accuracy when providing the injury information.

The method according to the present invention may be implemented in software or in hardware or in a mixed form made up of software and hardware, for example, in a control unit.

The present invention also provides an example device, which is designed to carry out, activate or implement the steps of a variant of a method provided herein in corresponding units. With this embodiment variant of the present invention in the form of a device as well, it is possible to quickly and efficiently achieve the object underlying the present invention.

An example device in accordance with the present invention may include at least one processing unit for processing signals or data, at least one memory unit for storing signals or data, at least one interface to a sensor or to an actuator for reading in sensor signals from the sensor or for outputting data signals or control signals to the actuator and/or at least one communication interface for reading in or outputting data, which are embedded in a communication protocol. The processing unit may, for example, be a signal processor, a microcontroller or the like, the memory unit capable of being a flash memory, an EPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

A device in the present case may be understood to mean an electrical device, which processes sensor signals and, as a function thereof, outputs control signals and/or data signals. The device may include an interface, which may be designed in hardware and/or in software. In a hardware design, the interfaces may, for example, be part of a so-called system ASIC, which contains a wide variety of functions of the device. It is also possible, however, for the interfaces to be dedicated integrated circuits or to be made at least partly of discrete components. In a software design, the interfaces may be software modules, which are present, for example, on a microcontroller alongside other software modules.

In one advantageous embodiment of the present invention, the vehicle is controlled by the example device. For this purpose, the example device may, for example, access sensor signals of the vehicle such as, for example, acceleration signals, pressure signals, steering angle signals or surroundings sensor signals. The activation may take place via actuators such as brake actuators or steering actuators or via an engine control unit of the vehicle.

Also advantageous is a computer program product or computer program having program code, which may be stored on a machine-readable medium or memory medium, such as a semiconductor memory, a hard disk memory or an optical memory, and which is used for carrying out, implementing and/or activating the steps of the method according to one of the previously described specific embodiments, in particular, when the program product or program is executed on a computer or a device.

BRIEF DESCRIPTION OF THE DRAWINGS

Exemplary embodiments of the present invention are depicted in the figures and are described in greater detail below.

In the following description of preferred exemplary embodiments of the present invention, identical or similar reference numerals are used for elements which are represented in the various figures and act similarly, a repeated description of these elements being omitted.

DETAILED DESCRIPTION OF EXAMPLE EMBODIMENTS

Figure 1:
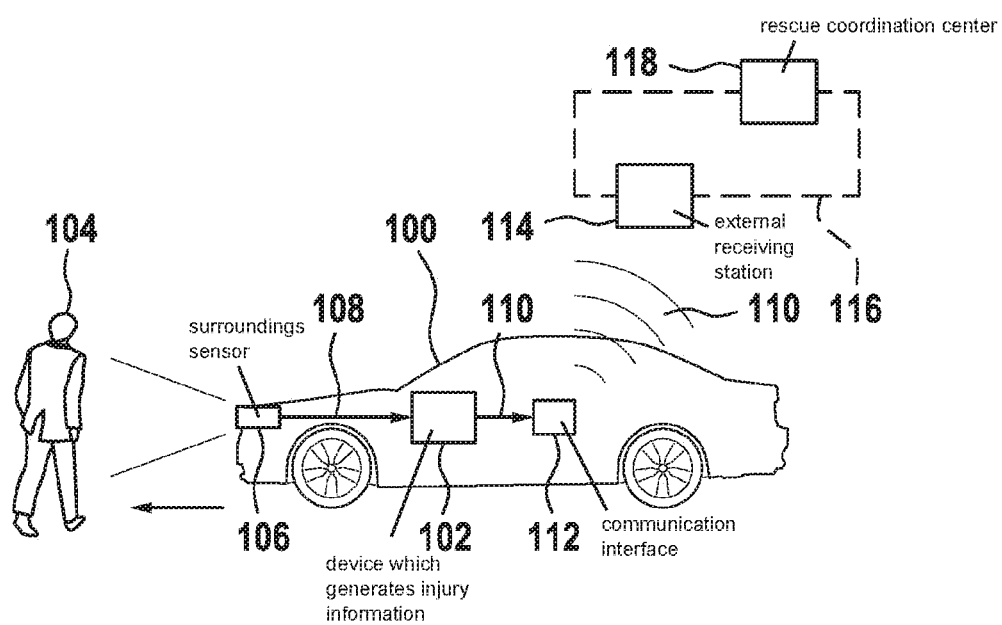
FIG. 1 schematically shows a representation of a vehicle including an example device according to one specific embodiment.

FIG. 1 schematically shows a representation of a vehicle 100 including an example device 102 according to one exemplary embodiment. An unprotected road user 104, here for example, a pedestrian, which is detectable by a surroundings sensor 106 of vehicle 100, is located in front of vehicle 100. A collision between vehicle 100 and pedestrian 104 is imminent. Multiple pedestrians or unprotected road users, which are to be assessed in a situation, may also be detected in front of vehicle 100. If, for example, a crowd of people is approached, such an estimation may then also be made for multiple road users. Surroundings sensor 106 transmits a sensor signal 108 representing road user 104 to device 102, which is designed to ascertain a parameter characterizing the imminent collision, for example, a probable collision speed using sensor signal 108. Based on the parameter, device 102 determines a probability of one or of multiple different predefined degrees of severity of an injury of road user 104 caused by the collision. The determination of the probability takes place using a suitable injury risk function representing the respective degree of severity, which assigns a particular value of the parameter a particular probability value for the respective degree of severity. As a result of this determination, device 102 generates a piece of injury information 110, which represents, for example, a probable injury severity of the injury or other rescue-relevant data relating to road user 104, and sends this information via a suitable communication interface 112 of vehicle 100 wirelessly to an external receiving station 114 of an emergency call system 116, which initiates a rescue chain for rescuing road user 104 based on injury information 110, for example, by automatically notifying a rescue coordination center 118.

Figure 2:
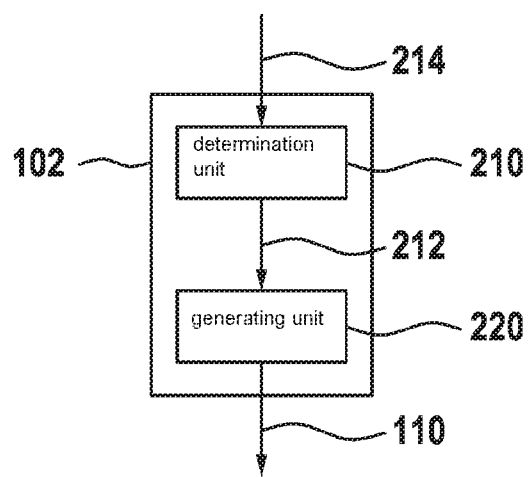
FIG. 2 schematically shows a representation of an example device from FIG. 1.

FIG. 2 schematically shows a representation of a device 102 from FIG. 1. Device 102 includes a determination unit 210 for determining a probability value 212 representing the probability of the respective degree of severity using the function representing the respective degree of severity, and a collision parameter 214 characterizing the collision, also referred to below as parameter. A generating unit 220 is designed to generate injury information 110 using probability value 212 and to send it to the receiving station of the emergency call system.

Figure 3:
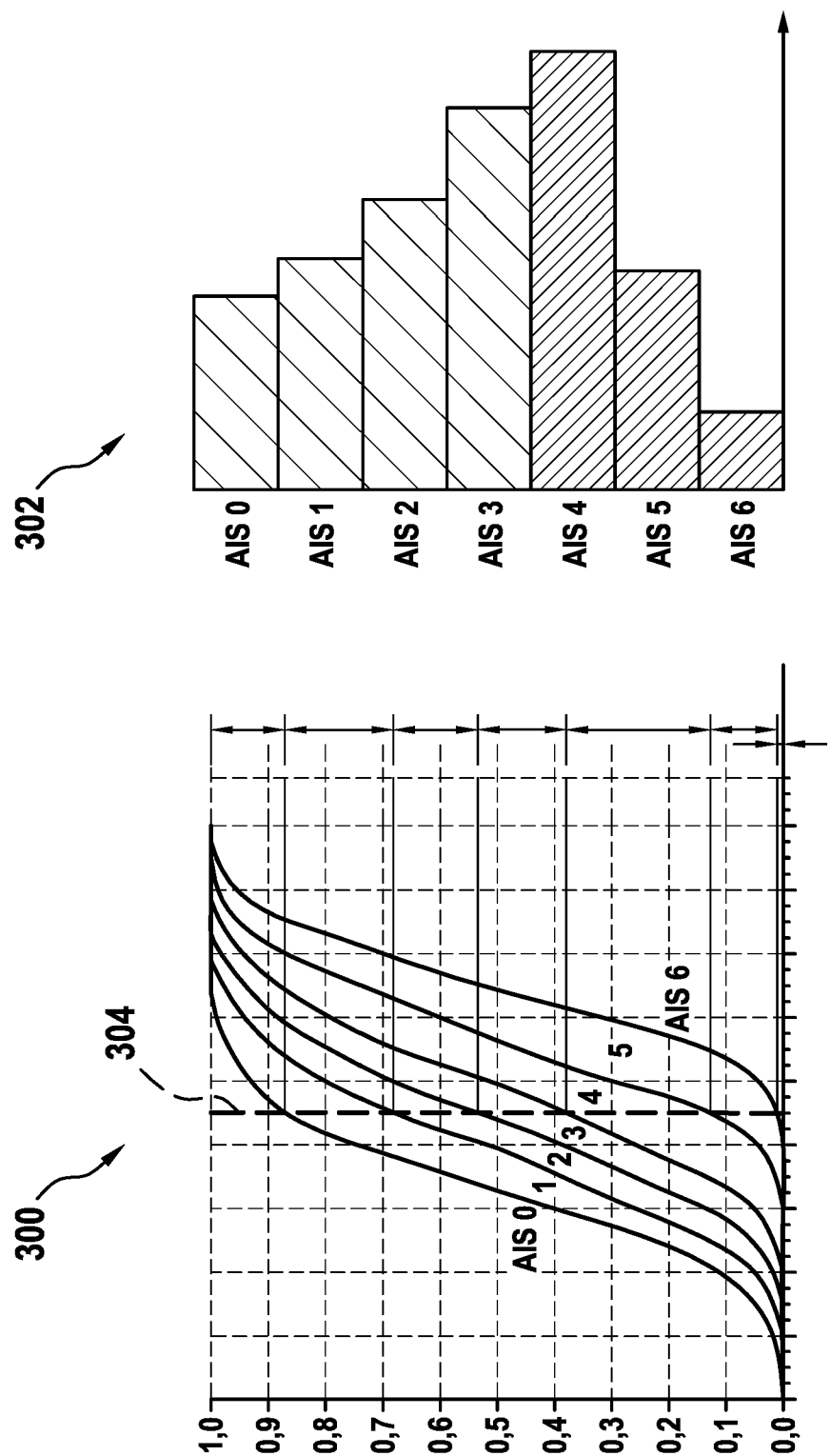
FIG. 3 shows diagrams for illustrating a distribution of an injury probability for determining different degrees of severity of an injury.

FIG. 3 shows two diagrams 300, 302 for illustrating a distribution of an injury probability for determining different degrees of severity of an injury using a device according to one exemplary embodiment, for example, the device described previously with reference to FIGS. 1 and 2. Left diagram 300 shows the injury probability as a function of one particular injury criterion. Plotted by way of example is a tolerance threshold 304 as well as seven degrees of severity 0, 1, 2, 3, 4, 5, 6 of a simplified rating scale, also referred to as abbreviated injury scale or AIS for short. Right diagram 302 shows the respective probability of the various degrees of severity 0, 1, 2, 3, 4, 5, 6.

Figure 4:
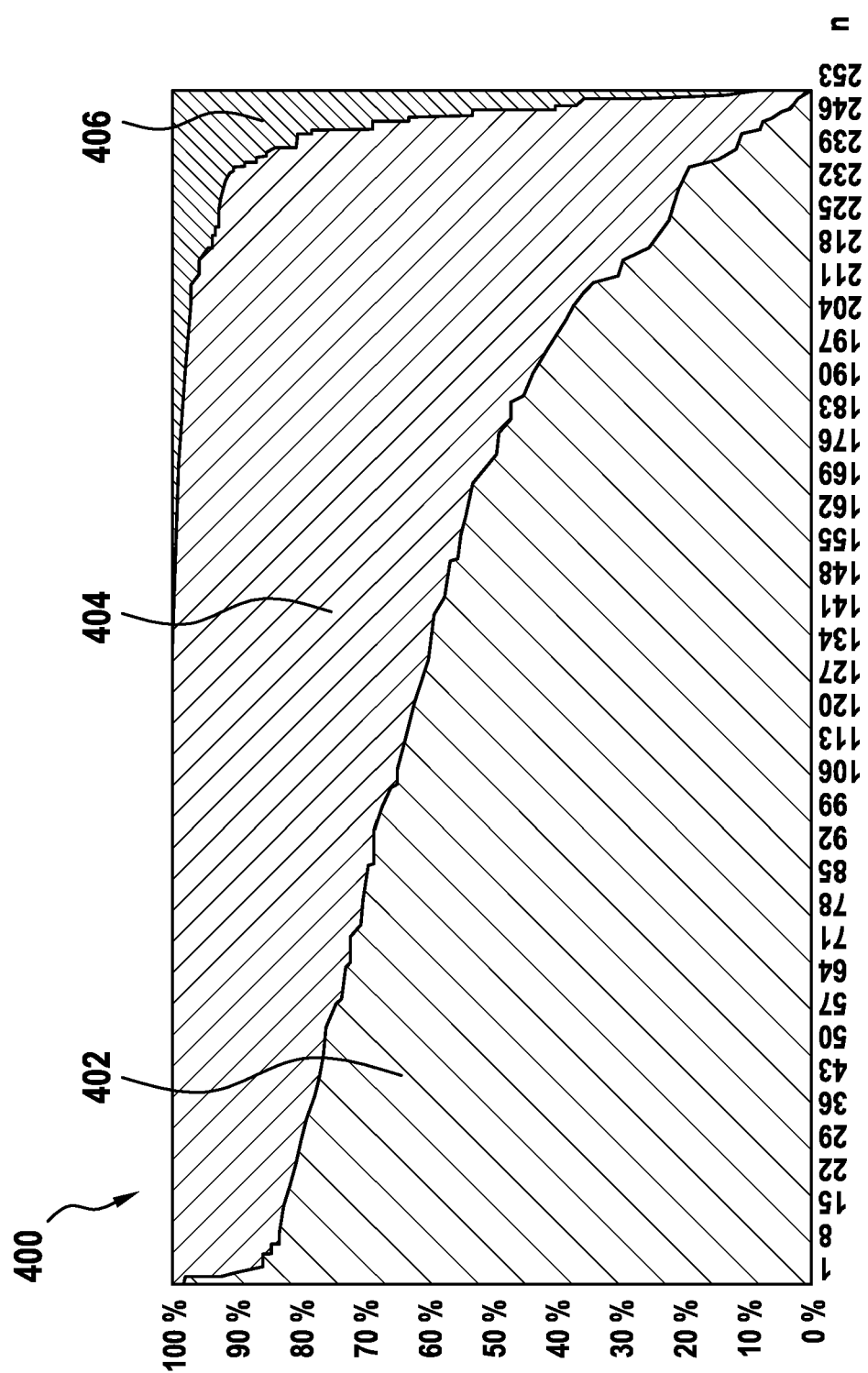
FIG. 4 shows a diagram for illustrating a probability of an injury risk for a crossing pedestrian in a car-primary collision.

FIG. 4 shows a diagram 400 for illustrating a probability of an injury risk for a crossing pedestrian in a car-primary collision. A first area 402 characterizes the probability of a slight injury of the pedestrian, a second area 404 characterizes the probability of a severe injury of the pedestrian and a third area 406 characterizes the probability of a fatal injury of the pedestrian. The estimated injury severity of the pedestrian based on the collision speed from n=255 video-documented accidents is shown by way of example. The number n is plotted on the x-axis of diagram 400.

If a threshold of greater than 50% is estimated as a measure of an injury severity, then the example illustrated in FIG. 4 shows that in 69% of the accidents, a probability of 50% of the pedestrians are slightly injured, 29% are severely injured and 2% are fatally injured. A driver typically initially runs out in order to provide first aid to the pedestrian or the generally unprotected road user. Here, valuable minutes for activating the rescue chain so that first aid measures may be immediately initiated have already elapsed. With knowledge of a possible injury severity, degree of severity according to body region, a walking direction and/or speed and, if necessary, a gender or age of the pedestrian, the rescue service already has valuable pieces of information at hand in order to provide first aid. Besides the primary collision and secondary collision with objects or the road, tertiary collisions, such as the hitting or running over by another previously uninvolved road user, may be included in the calculation.

For example, the pedestrian is struck at a collision speed of approximately 48 km/h. With the above approach, this results in a probability that the pedestrian suffers up to 65% severe injuries and up to 7% fatal injuries. In the case of a frontal collision, the pedestrian suffers very severe injuries to the head and hip area, for example. If the device has a video sensor system, the walking direction or the gender may, as previously mentioned, be used to estimate the injury severity. Alternatively, the pieces of information about the walking direction of the pedestrian may also be provided via a radar sensor system. Another sensor system or a communication with mobile terminals is also possible.

Figure 5:
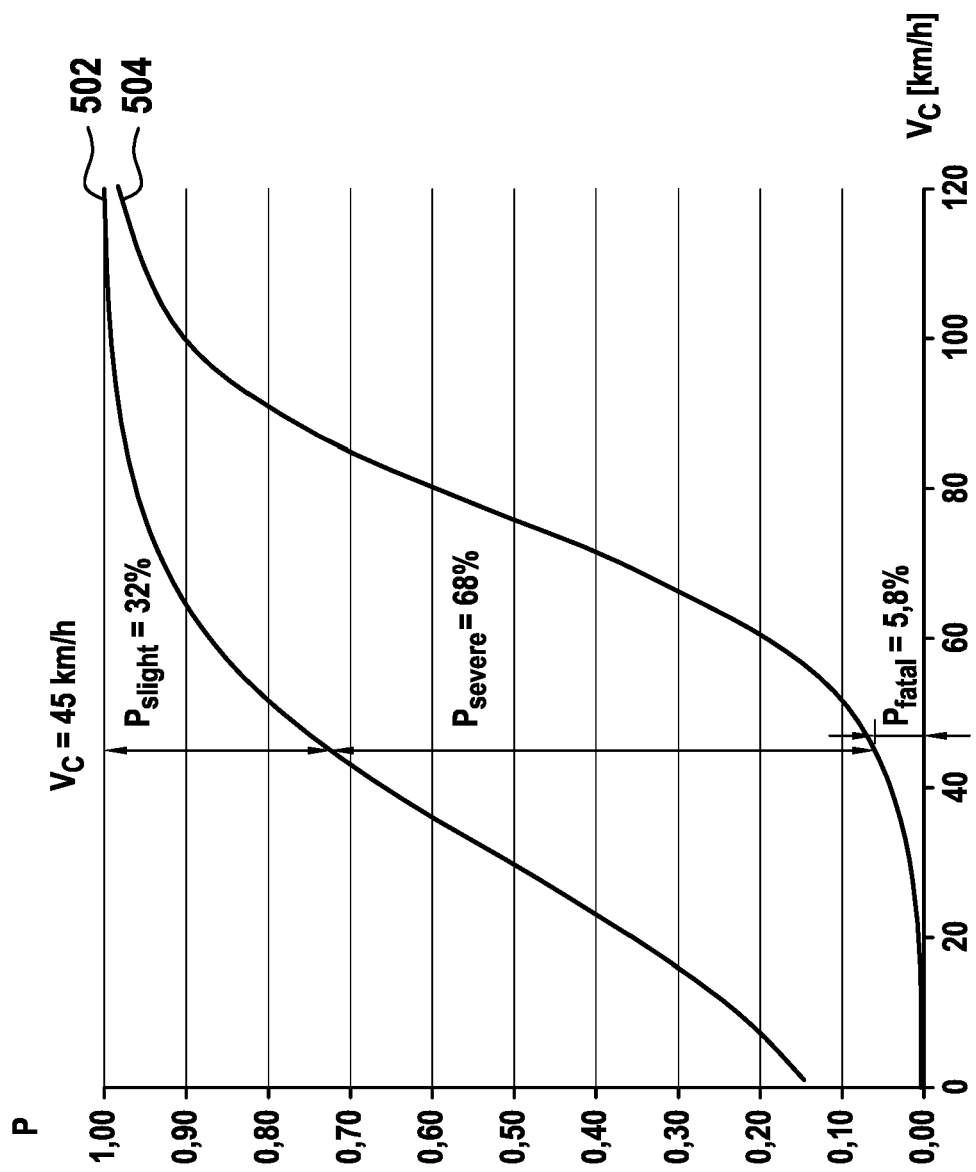
FIG. 5 shows a diagram for illustrating functions for determining a probability value using a device according to one exemplary embodiment.

FIG. 5 shows a diagram 500 for illustrating function values 502, 504 of two functions for determining a probability value using a device according to one exemplary embodiment. Injury risk functions for severe and fatal injuries in the event of a collision of a pedestrian with a forward moving car are shown, for example. A y-axis represents a probability p of 0.00 to 1.00. The collision parameter, here a collision speed $v_c$ in km/h, is plotted on an x-axis. The probability values are each delineated with a double arrow as a percentage for three different degrees of severity "slightly injured" ($p_{slight}$=32%), "severely injured" ($p_{severe}$=68%) and "fatally injured" ($p_{fatal}$=5.8%) at a collision speed $v_c$=45 km/h. In this case, the curve of function value 502 is determined by a first function representing the degree of severity "severely injured" and "fatally injured," whereas the curve of function value 504 is determined by a second function representing the degree of severity "fatally injured."

Figure 6:
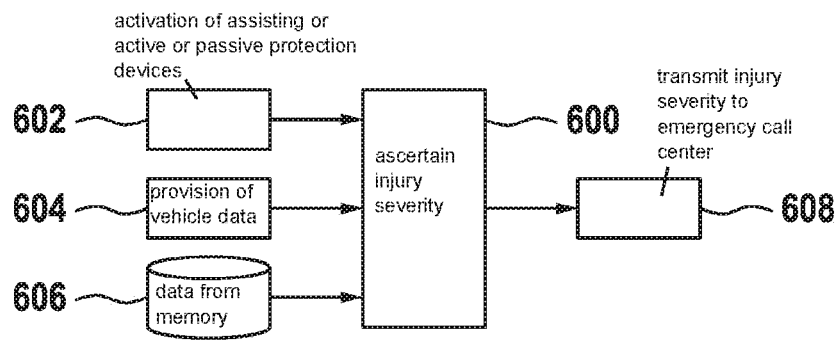
FIG. 6 shows a block diagram of an example sequence when providing a piece of injury information using a device according to one exemplary embodiment.

FIG. 6 shows a block diagram of an example sequence when providing a piece of injury information using an example device according to one exemplary embodiment. In this case, the injury severity of the road user is ascertained in a block 600 as a function of the activation of assisting or active or passive protection devices for unprotected road users of the vehicles in a block 602, as a function of the provision of vehicle data in a block 604 or as a function of data from an EEPROM or other memory in a block 606. The injury severity ascertained in block 600 is transmitted in a block 608 to the emergency call system.

Figure 7:
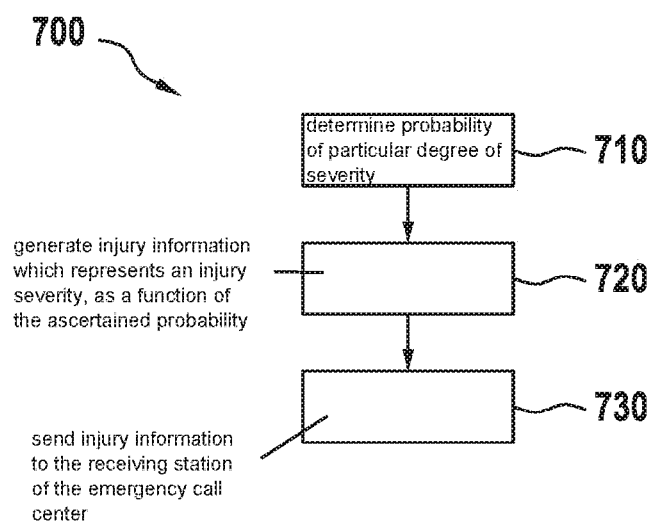
FIG. 7 shows a flow chart of an example method according to one exemplary embodiment.

FIG. 7 shows a flow chart of an example method 700 according to one exemplary embodiment. The method may be carried out, for example, by a device described previously with reference to FIGS. 1 through 6. In this case, the probability of a particular degree of severity of the injury of the road user is determined in a step 710 by assigning the collision parameter to a particular probability value with the aid of a suitable function. In a step 720, the injury information, which represents an injury severity, for example, is generated as a function of the probability ascertained in step 710. Finally, the injury information is sent in a step 730 to the receiving station of the emergency call system.

Various exemplary embodiments of the approach presented herein are described once again below in other terms with reference to FIGS. 1 through 7.

The injury severity, also referred to previously as degree of severity, characterizes the magnitude of changes of a physiological or structural nature. To describe the accident severity, a distinction is generally made between various body regions and types of injuries. These injury severities allow for a comparable and transparent reference to which rescue personnel, medical doctors or also vehicle engineers may refer. Thus, the injury severity is useful as a reference value in algorithms.

Different injury mechanisms may be the cause in one and the same body region. Thus, different tolerance thresholds also exist for different persons. These tolerances may be statistically established in the event of a collision of a vehicle with a pedestrian or another unprotected road user.

This dependency is reflected in an injury risk function, as it is shown, for example, in FIG. 3. In this case, AIS refers to the degree of severity of the injury, AIS=0 standing for uninjured and AIS=6 standing for fatally injured. The probability of an injury from 0 through 6 is then ascertained as a function of the injury criterion.

Device 102 is designed to ascertain, to store and to provide this injury probability as information to other control units or to an emergency call unit, for example, on the basis of pieces of vehicle information in the event of a collision with one or multiple unprotected road users.

The following pieces of information, for example, are used as a criterion for ascertaining such an injury probability:

trigger decision for passive pedestrian protection;
driving direction of the ego vehicle (forward, sideways or backward);
initial speed or collision speed of the ego vehicle;
preceding activation of an emergency braking system or evasion system of the ego vehicle;
estimated age or gender of the unprotected road user;
type of collision
walking or driving direction or estimated walking speed or driving speed of the road user and entry angle and collision angle;
pieces of car-to-VRU information such as age, gender, weight or previous illnesses of the road user, which are unblocked in an emergency situation and are conveyed, for example, via a smartphone or are stored on another device;
pieces of information of a vehicle sensor system of the vehicle, which represent, for example, an actual position of the road user relative to the vehicle;
pieces of information relating to disabilities of the road user, for example, directly or indirectly about a pace of the road user via detection of a wheelchair, of a cane or of a walking aid.

The pieces of information are used to improve the determination of the injury severity depending on the availability of the sensor system.

According to one exemplary embodiment, a one-dimensional injury risk function is used for this purpose. The underlying injury criterion, also previously referred to as collision parameter, is the collision speed. The functional correlation to the degree of the injury for a pedestrian is shown by way of example in FIG. 4. A collision speed of 45 km/h results, for example, in a probability of 5.8% for a fatal injury of the pedestrian. The pedestrian suffers severe or light injuries at a probability of 68% or 32%.

The underlying functional correlation is established, for example, with the aid of a logit function. The formula in this case is:

$$f(v_c) = \frac{1}{1 + e^{(a+b\,v_c)}},$$

The parameters a and b are variables, which are provided in a memory, for example. The variable $v_c$ refers to the collision speed and is obtained from vehicle data.

According to one exemplary embodiment, assisting or active or passive safety devices are initially activated with the aid of device 102 in the event of an imminent collision. In this case, a corresponding sensor system supplies a piece of information about the collision with the road user. An injury probability is ascertained with the aid of vehicle data, here the collision speed at the point in time of the contact and their functional correlation. For this purpose, a corresponding table is provided for an implementation in a control unit. Alternatively or in addition, a calculation takes place via an approximation of the efunction.

According to FIG. 6, the injury severity is ascertained using a trigger signal of an assisting or active or passive protection device. The information of the collision speed is obtained from vehicle data. In the same way, the activation of the corresponding protection devices takes place on the basis of these data. Parameters for describing the functional correlation are provided from a memory, for example. The following functional parameters are used, for example, for determining the probability of the degrees of severity "fatally injured" (fatal) and "severely and fatally injured" (fatal and severe).

|   | Fatal | Fatal and severe |
|---|---|---|
| a | −6.9218 | −1.7761 |
| b | 0.0917 | 0.0627 |

The result is then provided as information for other systems, for example, for an eCall system.

According to another exemplary embodiment of the present invention, an additional sensor system from the active safety or driver assistance is used. In this case, further pieces of information such as walking direction or speed of the road user are ascertained based on a pedestrian identification or bicycle identification. The line of sight of the road user is optionally also identified. Thus, it is possible to estimate whether the potentially struck road user is detected by the vehicle, is or is not involved in a collision. This has indirect consequences for muscle tension and thus also for the injury severity to be expected. These additional pieces of information are then used to estimate the injury severity. A multi-dimensional injury risk function, for example, is created for this purpose and stored in the memory in a parameterized manner. In this way, the quality of the calculation is improved.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for providing a piece of injury information about an injury of an unprotected road user in the event of a collision with a vehicle, comprising the following steps:
   determining a probability value which represents a probability of a degree of severity of the injury, using a function which represents the degree of severity as a function of at least one collision parameter characterizing the collision;
   producing the injury information using the probability value; and
   sending the injury information to a receiving station of an emergency call system to provide the injury information;
   wherein in the step of determining, at least one additional probability value, which represents a probability of an additional degree of severity of the injury, is determined using: (i) the function and/or (ii) a further function representing a further degree of severity of the injury, as a function of the collision parameter, the injury information being generated in the step of generating using the additional probability value;
   wherein in the step of determining, the additional probability value is determined by subtracting a sum of the probability value and a further probability value from a maximum probability value representing a maximum probability.

2. The method as recited in claim 1, wherein in the step of determining, the probability value is determined as the collision parameter as a function of a collision speed, with which the vehicle and the road user collide with one another.

3. The method as recited in claim 2, wherein in the step of determining, the probability value is determined using the following function:

$$f(v_c) = \frac{1}{1 + e^{(a+b\,v_c)}},$$

a standing for a first function parameter,
b standing for a second function parameter and
$v_c$ standing for the collision speed.

4. The method as recited in claim 1, further comprising the following step:
   reading in an activation signal, which represents an activation of at least one passenger protection device of the vehicle, the probability value being determined in the step of determining using the activation signal in response to the activation.

5. The method as recited in claim 1, further comprising the following step:
   ascertaining the collision parameter using an additional piece of information relating to the road user received via a communication interface of the vehicle.

6. The method as recited in claim 1, wherein the person protection device is a liftable engine hood or an airbag external to the vehicle.

7. A device configured to provide a piece of injury information about an injury of an unprotected road user in the event of a collision with a vehicle, the device configured to:
   determine a probability value which represents a probability of a degree of severity of the injury, using a function which represents the degree of severity as a function of at least one collision parameter characterizing the collision;

read in an activation signal, which represents an activation of at least one person protection device of the vehicle, the probability value being determined using the activation signal in response to the activation;

produce the injury information using the probability value; and send the injury information to a receiving station of an emergency call system to provide the injury information;

wherein for the determination, at least one additional probability value, which represents a probability of an additional degree of severity of the injury, is determined using: (i) the function and/or (ii) a further function representing a further degree of severity of the injury, as a function of the collision parameter, the injury information being generated in the step of generating using the additional probability value;

wherein for the determination, the additional probability value is determined by subtracting a sum of the probability value and a further probability value from a maximum probability value representing a maximum probability.

8. A non-transitory machine-readable memory medium on which is stored a computer program for providing a piece of injury information about an injury of an unprotected road user in the event of a collision with a vehicle, the computer program, when executed by a computer, causing the computer to perform the following steps:

determining a probability value which represents a probability of a degree of severity of the injury, using a function which represents the degree of severity as a function of at least one collision parameter characterizing the collision;

reading in an activation signal, which represents an activation of at least one person protection device of the vehicle, the probability value being determined in the step of determining using the activation signal in response to the activation;

producing the injury information using the probability value; and sending the injury information to a receiving station of an emergency call system to provide the injury information;

wherein in the step of determining, at least one additional probability value, which represents a probability of an additional degree of severity of the injury, is determined using: (i) the function and/or (ii) a further function representing a further degree of severity of the injury, as a function of the collision parameter, the injury information being generated in the step of generating using the additional probability value;

wherein in the step of determining, the additional probability value is determined by subtracting a sum of the probability value and a further probability value from a maximum probability value representing a maximum probability.

* * * * *